Aug. 9, 1960     R. L. CALDWELL ET AL     2,948,810
DELAYED GAMMA RADIATION LOG OF OXYGEN
Filed Oct. 25, 1954

RICHARD L. CALDWELL
STANLEY E. TURNER
INVENTORS

BY
ATTORNEY 2,948,810
Patented Aug. 9, 1960

2,948,810
DELAYED GAMMA RADIATION LOG OF OXYGEN

Richard L. Caldwell and Stanley E. Turner, Dallas, Tex., assignors, by mesne assignments, to Socony Mobil Oil Company, Inc., a corporation of New York Filed Oct. 25, 1954, Ser. No. 464,564

8 Claims. (Cl. 250—83.3)

This invention relates to activation analysis in radioactive well logging and, more particularly, to the determination of the concentration of fluids known to be present in formations in terms of the oxygen content thereof.

The present invention is based upon the discovery of significant relationships between the concentration of oxygen and the intensity and time duration of radioactivity in the time interval following cessation of neutron bombardment. The invention is based further upon the discovery that the variations in intensity of gamma radiation at a characteristic energy level or at a selected time interval following cessation of neutron bombardment may be taken as indicative of variations in oxygen concentration and thus may be utilized to identify the character of fluids entrapped in formations adjacent a borehole.

In accordance with the present invention, there is produced a log of relative amounts of oxygen in formations penetrated by a borehole as a function of depth. Such a log is useful in and of itself as determinative of the character of earth formations and constituents. The log is therefore useful for correlation with other such logs. It is also useful for correlation with conventional neutron logs which indicate relative quantities of hydrogen in borehole formations. High oxygen content in a region of hydrogen containing fluids may be taken as indicative of water saturation, whereas low oxygen content in a region of high hydrogen content may be taken as indicative of petroliferous accumulations.

In accordance with the present invention, there is provided a method which includes the steps of moving a source of high energy neutrons along the length of a borehole to induce radioactivity by the disintegration of an element contained in the fluid and the further step of measuring the intensity of gamma radiation in the borehole at about the half-life of the newly formed element following the cessation of irradiation. In a more specific aspect, the gamma radiation may be measured at about the half-life of Nitrogen 16 following cessation of bombardment. Alternatively, the measurement may be made at an energy level of about 6 to 7.2 m.e.v. In accordance with a further aspect of the invention, there is provided a well logging system for carrying out the aforementioned method.

For further objects and advantages of the invention and for a more complete understanding thereof, reference may now be had to the following description taken in conjunction with the accompanying drawings in which:

Fig. 1 diagrammatically represents a well logging system embodying the present invention;

Figure 1:
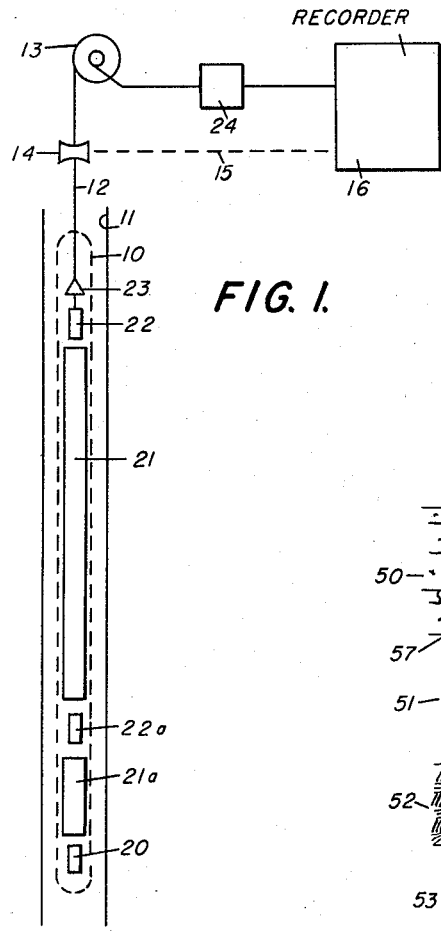

Referring now to Fig. 1, there is illustrated a well logging system including a pressure resistant, fluid tight exploring unit 10, whose outline is shown dotted, which is supported for movement along a well bore 11 by a cable 12 driven by a power reel 13. A cable measuring element 14, connected by coupling 15 to a recorder 16, is provided to drive a recording medium in recorder 16 such that the length of the recording medium is proportional to the depth of unit 10. The exploring unit 10 includes a source 20, preferably a gamma free source of neutrons whose energy is in excess of about 9.5 m.e.v. A shield 21 is positioned intermediate source 20 and a detector 22. Detector 22 is connected by way of an amplifier 23 to cable 12 for transmission of signals of radiations impinging detector 22. Such signals are applied by way of analyzing circuit 24 to recorder 16, whereupon there is produced a log of radiation as a function of depth.

As well understood by those skilled in the art, a conventional neutron log is produced by utilizing a source such as source 20 and a detector such as detector 22a placed closely adjacent the source as shielded therefrom by mass 21a. Neutrons irradiating the formation cause gamma rays to be produced through nuclear interactions in the formations and such induced gamma radiation is detected and recorded as a function of depth. Such a log, known as a "neutron log," indicates the intensity or total number of gamma rays impinging the detector over a given measuring interval and indicates the relative hydrogen content of the various formations traversed.

Thus a relatively high hydrogen content in the formations will indicate the presence of formation fluids. Of great value would be a determination of the character of such fluids, particularly as to whether or not they comprise the hydrocarbons or salt water or the like in order to determine the depth at which petroleum production might be obtained. Such information would be a guide to well completion procedures.

Figure 2:
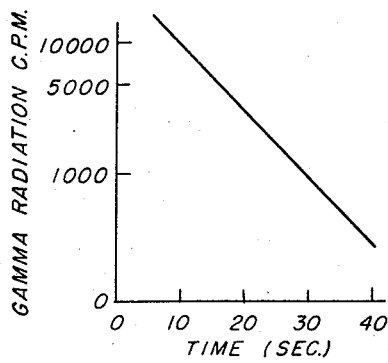
Fig. 2 is a plot showing the decay of radiation following neutron bombardment of oxygen.

In accordance with the present invention, there is provided a log of the oxygen content of the formations. As will hereinafter be shown, such a log may be found highly informative as to the character of fluids in the formations. Neutron bombardment of saturated materials produces disintegration of the oxygen present to produce nitrogen 16. Nitrogen 16, being unstable, thereafter decays with a characteristic half-life of about 7.3 seconds through radiation of gamma rays. This radiation is confined to a fairly narrow and distinctive and characteristic energy band in which there are three resonances, one at 6.13 m.e.v. and one at 6.9 m.e.v. and one at 7.10 m.e.v. Therefore, in accordance with the present invention, the relative oxygen content may be determined by measuring gamma radiation at a selected time interval following cessation of bombardment where the time interval is related to the half-life of nitrogen 16. Alternatively, a measurement may be made at any time following cessation of bombardment if confined to a measurement of gamma radiation within or substantially entirely dependent upon the above energy band. Referring to Fig. 2, it will be seen that the decay of gamma radiation from oxygen is a logarithmic function with the gamma radiation decreasing by a factor of one-half every 7.3 seconds. Similarly, it has been found that the half-life of radiations resulting from bombardment of carbon which might be present in significant amounts is in the order of 27 milliseconds and that silicon and aluminum have half-lives much greater than the 7.3 second index for oxygen. Other elements that may be present in earth formations in significant amounts do not exhibit delayed gamma radiation upon activation of neutron bombardment such as to interfere with obtaining measurements specific to oxygen.

Figure 3:
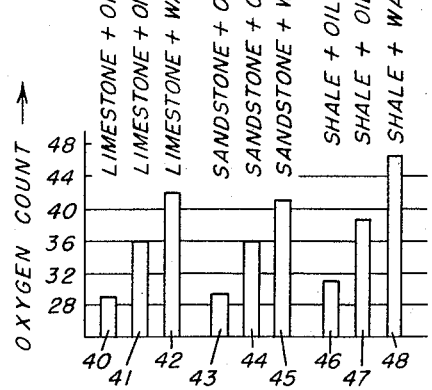
Fig. 3 illustrates delayed activity characteristics of certain formation fluids.

The certainty with which a log of the variations in concentration of oxygen may indicate the character of fluid saturation is shown in Fig. 3. In Fig. 3 it will be seen that gamma radiation form limestone, sandstone and shale saturated with oil is consistently much lower than when a given formation is saturated with water or with an oil-water mixture. More particularly, the first bar 40 indicates a relative gamma radiation count of 29 for limestone saturated with oil. Bar 41 indicates a relative gamma ray count of 36 when the same limestone was saturated with an oil-water mixture. Bar 42 indicates a gamma radiation count of 42 for the same limestone saturated with water. Similar characteristic results are shown by bars 43, 44 and 45 in which a sandstone is saturated with oil, oil and water and water, respectively. The same features are shown in bars 46, 47 and 48 in which a shale was saturated with oil, oil plus water and water, respectively. The consistency of the gamma radiation for the specific conditions portrayed in Fig. 3 indicates the reliability of such measurements in the identification of the character of fluid saturation of a given formation.

In operation and in accordance with the present invention, the system of Fig. 1 may be lowered through a borehole with source 20 irradiating the formations. Detector 22 is spaced from source 20 by a distance such that prompt gamma radiation resulting from the neutron bombardment does not reach the detector. However, delayed gamma radiation is detected as the detector 22 moves into a zone which was bombarded by source 20, seconds earlier. More particularly, with a four foot spacing between source 20 and detector 22 and a lowering rate of 30 feet per minute, the gamma radiation impinging detector 22 will be due primarily to the radiation from nitrogen 16 produced by neutron bombardment and disintegration of oxygen. If a log is to be made as the unit 10 is withdrawn from the borehole, the source 20 would be positioned above the detector 22 with a spacing related to the speed at which the log is to be taken and preferably such that a time interval of approximately the half-life of nitrogen 16 elapses between the times that source 20 and detector 22 are adjacent a given point in the well bore.

It has been found that in order to cause disintegration of oxygen as to produce the unstable nitrogen 16, high energy neutrons, which as used in the present application shall mean neutrons of an energy in excess of about 9.5 m.e.v., must be employed. A preferred source for this logging method may comprise a system in which the reaction of deuterium on tritium is employed for production of monoenergetic neutrons at 14 m.e.v. without the attendant production of gamma rays. The U.S. Patent No. 2,689,918 to Youmans also discloses a deuterium-tritium source for producing 14 m.e.v. neutrons free of gamma rays and suitable for use in the practice of the present invention.

If the source-detector spacing is related to the speed of logging such that the lapse of time between bombardment and detection is related as above-described to the half-life of nitrogen 16, the detector 22 may comprise a Geiger-Müller counter or a proportional counter and the intensity of gamma radiation may be logged to indicate oxygen concentration. This is possible since radiation in that interval due to nitrogen 16 decay is more intense than radiation from any other induced radioactive source in the borehole.

Delayed gamma radiation from fast neutron bombardment of common elements found in sedimentary formations and in fluid hydrocarbons and water are shown in Table I. The elements which gave appreciable gamma radiation and the product formed in each case along with the half-life of the radioactivity and the energy of the gamma rays is included.

Table I

| Element Bombarded | Radioactive Product Formed | Half-Life | Gamma-Ray Energy, m.e.v. | Figure of Merit |
|---|---|---|---|---|
| Oxygen | Nitrogen | 7.3 seconds | 6.13<br>7.10 | $1.05 \times 10^{-2}$ |
| Silicon | Aluminum | 2.3 minutes | 1.78 | $1.31 \times 10^{-3}$ |
| Aluminum | Magnesium | 9.6 minutes | 0.89<br>1.01 | $8.56 \times 10^{-5}$ |
| Aluminum | Sodium | 15 hours | 1.38<br>2.78 | $1.41 \times 10^{-6}$ |
| Chlorine | Chlorine | 33 minutes | .16<br>.50<br>1.02<br>2.1<br>3.2 | $9.5 \times 10^{-7}$ |
| Magnesium | Sodium | 15 hours | 1.38<br>2.78 | $3.02 \times 10^{-6}$ |

When any of the foregoing substances are bombarded, the resultant initial intensity of activation ($I_0$) is determined by a number of factors.

$n$—the number of atoms of the substance present. This is effectively the amount of material in the volume irradiated and may be expressed as the weight ($W$) of the substance in this volume, divided by its atomic weight ($A$) times the number of atoms in an atomic weight ($N = 6.023 \times 10^{23}$).

$f$—the effective neutron concentration or flux; that is, the number of neutrons per unit time to which the substance is exposed.

$\sigma$—the excitation constant or reaction probability. This is the effective cross-sectional area presented by a nucleus of the substance bombarded. This variable depends on the nature of the substance, the energy of the neutron, and the type reaction to be considered.

$e$—the counter efficiency. This is the fraction of the total number of gamma rays emitted which will be measured by the detector used.

$\lambda$—the decay constant of the isotope produced.

$m$—the isotopic fraction of the substance contributing to the reaction.

$t$—the time of bombardment.

Combining the foregoing factors, an activation equation is obtained:

$$I_0 = \lambda \sigma \frac{d}{A} Nfem \frac{1 - e^{-\lambda t}}{\lambda} \qquad (1)$$

The quantities $A$, $N$, $\lambda$, $\sigma$, and $m$ may be combined as a single variable F.

$$F = N\lambda\sigma m / A \qquad (2)$$

The quantity ($F$) then represents a "figure of merit" for the activation of a particular element. For bombardment times short compared to the half-life of the radioactivity produced, the figure of merit shown in the last column in Table I is a measure of the relative activity produced in each of the elements listed.

From a consideration of the figure of merit for the elements above noted, it will be seen that within the half-life of activated oxygen the delayed gamma radiation will have an intensity which is orders of magnitude above the radiation from the other induced sources and further, that if neutron bombardment is limited to a period corresponding to the half-life of nitrogen 16 produced by bombardment of oxygen, then relatively little activity will have been induced in other elements thus further increasing the ratio of activity due to oxygen compared to all other activities. Therefore, measurement of delayed gamma radiation intensity at about the half-life of nitrogen 16 insures a measurement substantially entirely controlled by the oxygen concentration in the adjacent formations.

Delayed gamma radiation measured at a time other than above described preferably will be made on an energy selective basis. A scintillation counter system such as illustrated and described in Patent No. 2,686,268 to Martin et al. may thus be employed to advantage. In one case, a differential count preferably will be made to include gamma radiation of from 6.1 to 7.2 m.e.v. In another case, the differential count may be narrowed as to include only a narrow band of delayed gamma radiation having an energy level of about 6.13 m.e.v. or an energy level of about 7.10 m.e.v. both of which are radiations uniquely related to high energy neutron bombardment of oxygen. In still another case, an integral count may be employed as to include all gamma radiation above a minimum level of, for example, 3 m.e.v. In either case there is produced a log uniquely related to the relative concentration of oxygen over the length of the borehole thus traversed.

Figure 4:
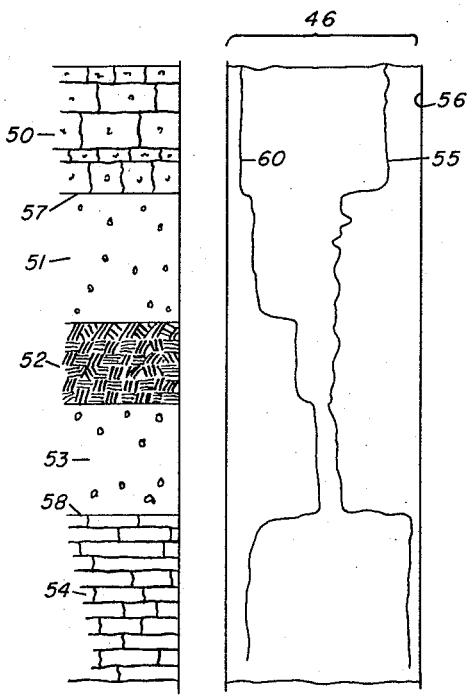
Fig. 4 illustrates induced radioactive properties of contrasting earth formations.

In Fig. 4 there is illustrated an earth section in which a layer of limey sand 50 overlies a fluid saturated zone including a first sandy section 51 saturated with oil, a second zone 52 saturated with an oil-water mixture and a third zone 53 saturated with salt water. A bed strata 54 of dense limestone forms the base of the liquid reservoir. A conventional neutron log of the formation in idealized form is represented by the trace 55 on the record 56. Following the usual neutron log convention, a deflection to the right indicates increased radioactivity, which in turn means lower hydrogen content. In the sandy lime 50 the hydrogen content is very low and abruptly deviates to a high value at a point corresponding to the boundary 57 between the limey sand 50 and the sand 51.

Throughout the section 51, 52 and 53 relatively low values of prompt gamma radiation produce a relatively quiescent trace which indicates a section of high hydrogen content. At a point corresponding to the boundary 58 between beds 53 and 54, the dense limestone containing little or no hydrogen is such as to cause a high radiation, even higher than that of the sandy limestone 50. Thus with the neutron log 55 the interpreter would recognize the presence of a concentration of hydrogen over the section 51, 52 and 53.

A companion log represented by trace 60, in idealized form, will give the interpreter a key to the character of the fluids in zones 51, 52 and 53. Here again a deflection to the right indicates increased radioactivity, which in this case means higher oxygen content. In the oil saturated zone the oxygen content is approximately the same as that in the limey sand 50. However, the oil-water saturated zone 52 having considerably more oxygen is characterized by an increase delayed gamma activity. Even greater delayed gamma activity characterizes the water saturated zone 53 followed by a very low activation for zone 54. Thus in accordance with the present invention there is provided a method in which formations penetrated by a borehole are bombarded with high energy neutrons and measurements made (1) of the intensity of prompt gamma radiation resulting therefrom and (2) of (a) the delayed gamma radiation in the selected oxygen band or (b) the total intensity at about the half-life of nitrogen 16.

Having described the invention in connection with certain modifications thereof, it will be understood that further modifications may now suggest themselves to those skilled in the art and it is intended to cover such modifications as fall within the scope of the appended claims.

What is claimed is:
1. The method of determining variations in oxygen concentration in earth formations which comprises moving a source of neutrons of energy of at least 9.5 m.e.v. along a well bore to bombard formations adjacent the well bore, detecting gamma radiation following cessation of bombardment by an interval of the order of the half-life of nitrogen 16 at successive points in said well bore, and selectively recording the intensity of the component of the detected gamma radiation characteristic as to time and energy of emanations from nitrogen 16 produced upon disintegration of oxygen as a function of depth in said well bore.

2. The method set forth in claim 1 in which all delayed gamma radiation above about 3 m.e.v. is recorded.

3. The method set forth in claim 1 in which delayed gamma radiation of 6.13 m.e.v. and 7.10 m.e.v. is recorded.

4. The method of identifying a fluid known to be present in formations adjacent a borehole by detecting the presence or absence of oxygen which comprises moving along the length of the borehole a source of neutrons to bombard said fluids with neutrons having energies in excess of 9.5 m.e.v. to induce radioactivity by the disintegration of oxygen contained in said fluid, measuring at a predetermined time interval of the order of the half-life of nitrogen 16 following the cessation of bombardment the intensity of the gamma radiations in the energy band of about 6 to 7.5 m.e.v. as an index to the presence or absence of oxygen containing water as distinguished from hydrocarbons which do not contain oxygen.

5. The method of identifying fluid character of formations penetrated by a borehole which comprises moving a source of neutrons of energy at least 9.5 m.e.v. along the length of said borehole to irradiate adjacent formations, detecting the prompt gamma radiation resulting from such bombardment, recording the intensity of said detected radiation as a function of borehole depth, detecting the gamma radiation at about the half-life of nitrogen 16 following cessation of bombardment at any point in said borehole, and recording the intensity of the latter radiation in correlation with depth in said well bore.

6. The method of identifying fluid character of formations penetrated by a borehole which comprises moving a source of neutrons having energies in excess of about 9.5 m.e.v. along the length of said borehole to irradiate adjacent formations, detecting the prompt gamma radiation resulting from such bombardment, recording the intensity of said detected radiation as a function of borehole depth, in the interval of several seconds following cessation of bombardment detecting the delayed gamma radiation, and recording the detected radiation having energy above about 6 m.e.v. in correlation with depth in said well bore.

7. A system for producing a log of variations in the concentration of oxygen in earth formations which comprises a source of neutrons of energy of at least 9.5 m.e.v., means for supporting said source for movement along a well bore to bombard formations adjacent said well bore, means spaced from said source for detecting the delayed gamma radiation resulting from bombardment of said formations delayed for a period of about the half-life of nitrogen 16, and means including a recorder for selectively recording the intensity of the component of said delayed gamma radiation which emanates from nitrogen 16 as a function of depth in said well bore.

8. A system for producing a log of variations in concentration of oxygen in earth formations which comprises a source of neutrons having energies of at least about 9.5 m.e.v., means for moving said source along the well bore to bombard adjacent earth formations, a detector of gamma radiation supported for movement with said source and in a trailing relation and spaced from said source at a distance dependent upon the speed of travel thereof through said borehole such that said detector passes a point following said source by an interval of about the half-life of nitrogen 16, and means coupled to said detector including a recorder for recording as a function of depth in said well bore the intensity of the gamma radiation detected by said detector.

References Cited in the file of this patent

UNITED STATES PATENTS

| | | |
|---|---|---|
| 2,308,361 | Fearon | Jan. 12, 1943 |
| 2,353,619 | Pontecorvo et al. | July 11, 1944 |
| 2,648,012 | Scherbatskoy | Aug. 4, 1953 |
| 2,689,918 | Youmans | Sept. 21, 1954 |
| 2,752,504 | McKay | June 26, 1956 |
| 2,769,096 | Frey | Oct. 30, 1956 |